United States Patent
Fell et al.

(10) Patent No.: US 8,616,265 B2
(45) Date of Patent: Dec. 31, 2013

(54) COOLER ASSEMBLY FOR A VEHICLE COOLING SYSTEM

(75) Inventors: Thomas Fell, Oberleichtersbach (DE); Andreas Keim, Mutterstadt (DE); Duong M Le, Waterloo, IA (US)

(73) Assignee: Deere & Company, Moline, IL (US)

( * ) Notice: Subject to any disclaimer, the term of this patent is extended or adjusted under 35 U.S.C. 154(b) by 1203 days.

(21) Appl. No.: 12/503,337

(22) Filed: Jul. 15, 2009

(65) Prior Publication Data

US 2010/0025007 A1    Feb. 4, 2010

(30) Foreign Application Priority Data

Jul. 31, 2008  (DE) .......................... 10 2008 040908

(51) Int. Cl.
*B60H 1/00*    (2006.01)
(52) U.S. Cl.
USPC .................................. 165/41; 165/77; 165/78
(58) Field of Classification Search
USPC .......... 165/77, 78, 41; 16/365, 362, 350, 352; 49/154, 258, 176, 201
See application file for complete search history.

(56) References Cited

U.S. PATENT DOCUMENTS

| | | | | |
|---|---|---|---|---|
| 664,993 A * | 1/1901 | Chmelitzek | ..................... | 49/161 |
| 2,040,947 A * | 5/1936 | Mojonnier et al. | ............. | 165/77 |
| 2,615,687 A * | 10/1952 | Simmons | ........................ | 165/78 |
| 3,334,704 A * | 8/1967 | Gehrke et al. | ............... | 180/68.4 |
| 4,066,119 A * | 1/1978 | Stedman | ........................ | 165/41 |
| 4,531,574 A * | 7/1985 | Hoch | .............................. | 165/67 |
| 4,696,361 A * | 9/1987 | Clark et al. | .................. | 180/68.4 |
| 4,825,815 A * | 5/1989 | Turner | ...................... | 123/41.49 |
| 5,185,955 A * | 2/1993 | Pedersen | ........................ | 49/216 |
| 5,237,775 A * | 8/1993 | Hardy | ............................. | 49/181 |
| 5,237,831 A * | 8/1993 | Sikora | ............................. | 62/159 |
| 5,386,873 A * | 2/1995 | Harden et al. | ................. | 165/47 |
| 6,024,164 A * | 2/2000 | Sorbel | ............................ | 165/41 |
| 6,105,660 A * | 8/2000 | Knurr | ............................. | 165/41 |
| 6,966,355 B2 * | 11/2005 | Branham et al. | ............... | 165/41 |
| 7,089,994 B2 * | 8/2006 | Esposito et al. | ................. | 165/42 |
| 7,370,690 B2 * | 5/2008 | Rasset et al. | .................... | 165/41 |
| 7,398,847 B2 * | 7/2008 | Schmitt | ....................... | 180/68.4 |
| 7,401,672 B2 * | 7/2008 | Kurtz et al. | ................... | 180/68.4 |
| 7,836,549 B1 * | 11/2010 | McGuigan | ..................... | 16/266 |
| 7,861,988 B2 * | 1/2011 | Hamida et al. | ................. | 248/232 |

(Continued)

FOREIGN PATENT DOCUMENTS

| DE | 27 00 609 | 7/1978 |
|---|---|---|
| DE | 102 07 025 | 8/2003 |

(Continued)

*Primary Examiner* — Marc Norman
*Assistant Examiner* — Devon Russell (57) ABSTRACT

The invention concerns a cooler assembly for a vehicle cooling system, with a cooling unit pivotally attached to a retaining element. The retaining element is slidable in a lengthwise direction along a guide element which is attached to the cooling system, so that the cooling unit can be moved from an operating position by sliding and subsequent pivoting into a maintenance and cleaning position.

11 Claims, 5 Drawing Sheets

(56) References Cited

U.S. PATENT DOCUMENTS

| | | | |
|---|---|---|---|
| 7,950,443 B2* | 5/2011 | Rasset et al. | 165/41 |
| 8,096,347 B2* | 1/2012 | Starkey et al. | 165/41 |
| 8,312,951 B2* | 11/2012 | Bui et al. | 180/68.4 |
| 2003/0047656 A1* | 3/2003 | Neufang | 248/229.12 |
| 2003/0168269 A1* | 9/2003 | Pfusterschmid et al. | 180/68.4 |
| 2005/0173095 A1* | 8/2005 | Fujita et al. | 165/77 |
| 2006/0005943 A1* | 1/2006 | Rasset et al. | 165/77 |
| 2006/0225362 A1* | 10/2006 | Pettit et al. | 49/445 |
| 2008/0135209 A1* | 6/2008 | Lowe et al. | 165/77 |
| 2008/0283214 A1* | 11/2008 | Starkey et al. | 165/41 |
| 2010/0222194 A1* | 9/2010 | Maddaleni et al. | 493/288 |

FOREIGN PATENT DOCUMENTS

| | | | |
|---|---|---|---|
| DE | 102 06 551 | 9/2003 | |
| DE | 10 2005 014 614 | 5/2006 | |
| DE | 102007006928 A1 * | 8/2008 | ............. B60K 11/04 |
| EP | 1 930 197 | 6/2008 | |

* cited by examiner

COOLER ASSEMBLY FOR A VEHICLE COOLING SYSTEM

FIELD OF THE INVENTION

The present invention relates to a radiator or cooler assembly for a vehicle cooling system, with a retaining element and at least one cooling unit fastened to the retaining element.

BACKGROUND OF THE INVENTION

Agricultural vehicles are normally provided with multiple various cooling units for removing the heat rejected during the operation. Usually the cooling units are arranged in the form of a cooler stack located in an engine compartment arranged one behind the other in the common cooling air flow. Contaminants drawn in from the surroundings of the vehicle by the cooling air flow could be deposited on the surface of the cooling unit and thereby impair their cooling ability. Since, above all, the interior cooling units of the cooler stack are not immediately accessible from the outside and therefore cannot be cleaned without difficult disassembly of the vehicle cooling system, the cleaning or maintenance cost is correspondingly high.

Various procedures for circumventing this problem are known from the state of the art. The publication EP 0 956 024 B1 discloses a radiator or cooler assembly consisting of several cooling units for an agricultural utility vehicle. The cooling units, in each case, form a common air intake chamber consisting of several side components, where the air intake chamber is provided with a frame structure supporting the cooling units. One of the cooling units is fastened to a forward part of the frame structure that can be pivoted to the side. Since all of the cooling units are accessible from the outside as well as from the inside—by pivoting the forward part of the frame structure—, the necessary cleaning and maintenance operations can be performed without complicated disassembly of the vehicle cooling system.

Furthermore, a sales brochure for a mobile excavator M318D manufactured by Caterpillar, shows a cooling system in which a blower assembly and a coolant condenser of an air conditioning system of the mobile excavator are retained in such a way that these can be pivoted upward from a generally horizontal operating position into a maintenance position accessible from the outside, so that both sides of the blower assembly and the coolant condenser can be cleaned.

Because of the limited space available typically in an engine compartment, these known solutions are not appropriate for pivoting cooling units in a cooler stack in an engine compartment.

SUMMARY OF THE INVENTION

Accordingly, an object of this invention is to provide cooling system arrangement which makes possible a simplified cleaning or maintenance of a cooling unit in a vehicle cooling system, even when there is reduced space availability.

This and other objects are achieved by the present invention, wherein a cooler assembly for a vehicle cooling system includes a retaining element and at least one cooling unit pivotally fastened to the retaining element. The retaining element is arranged so that it can be slid along a guide element that can be attached to the vehicle cooling system, so that the cooling unit can be brought from an operating position into a maintenance position provided for cleaning by sliding followed by pivoting. The cooling unit may be a component of a vehicle cooling system located in the engine compartment of a motor vehicle. That is, the cooling unit can be brought into a position before the pivoting by sliding into an (intermediate) position generally outside of the engine compartment. In particular, the cooler assembly may be configured a cooler stack so that the cooler elements form cassette-like insertions, that can be extracted individually from the cooler stack and can be pivoted into a position appropriate for cleaning or maintenance outside of the cooler stack or the engine compartment. Alternatively, only the outermost cooling unit of the cooler stack in the above described manner may be slid and subsequently pivoted into a position, so that at least its rear side or the front side of a cooling unit located immediately behind it is accessible from the outside.

This cooler assembly may include various types of coolers, and it may be installed at various locations. Moreover, this cooler assembly can used in a vehicles wherever cleaning and maintenance of the vehicle cooling system would be costly because of construction limitations.

The cooling unit may, for example, be a condenser of a vehicle air conditioning system, an oil cooler for vehicle gearbox, a charge oil cooler for an internal combustion engine, air-fluid-cooler of a high temperature or low temperature cooling circuit, or for any desired combination of the aforementioned cooling units.

Preferably, the guide element includes a sliding rod. The sliding rod has a circular cross section with a typical diameter in the range of 5 to 15 mm. Furthermore, the guide element may include an attachment leg for an attachment to the vehicle cooling system. More precisely the attachment is performed by means of an attaching element provided in the end region of the attaching leg, for example, by means of a screw thread formed onto the attaching leg, and/or an attaching bracket fastened thereto. In addition or alternatively an attachment by welding to a frame structure associated with the vehicle cooling system is also conceivable.

In particular, the sliding rod and the attaching leg may be one piece components of the vehicle cooling system, so that the guide element can be assembled in a single manufacturing cycle by chamfering and bending of a one piece penetrating component. The one piece penetrating component, in this case may be a steel or aluminum alloy full or hollow section. The guide element configured in this way is protected against corrosion by enameling, galvanizing or having its surface treated in similar ways.

Preferably the retaining element is configured as a sliding carriage. The sliding carriage is provided with a slotted opening that accepts the sliding rod. The slotted opening surrounds the sliding rod at least in part; it is in the form of a rider, particularly in such a way that the sliding carriage can be slid largely along the sliding rod without any play. The sliding carriage may consist of a self lubricating or heat resistant material, particularly polytetraflouroethylen. Alternatively, it may be a sliding body consisting of a steel or aluminum alloy.

The cooling unit is pivotally fastened to the retaining element by a hinge. The hinge is a component of a frame structure of the cooling unit. In order to permit a configuration or the exchange with cooling unit, the hinge is fastened to the retaining element so that it can be released with the use of appropriate fastening elements, for example by means of a threaded bolt or the like. Alternatively, however, a non-removable connection is also possible, for example, by means of a riveted connection with the retaining element.

The cleaning or maintenance of the cooling unit can be simplified further if a locking element is provided for the temporary securing of the retaining elements in the operating position or the maintenance position. In particular, the locking element may include a spring element for the establishment of a temporary rest position with the attachment leg of the sliding rod, so that an unintentional sliding of the cooling unit during the cleaning and maintenance operation and/or during the operation of the motor vehicle can be avoided. In addition, or alternately, the cooling unit can be secured in the operating position by establishing a releasable screw connection between the cooling unit or the frame component associated with the vehicle cooling system.

To permit an unimpeded movement of the cooling unit between the operating position and the maintenance position, the cooling unit can be connected with the vehicle cooling system by means of flexible coolant lines. The coolant lines consisting of fiber reinforced rubber are preferably arranged on the side away from the retaining elements of the cooling unit and connected there by means of releasable hose connections.

Furthermore, a sliding guide arrangement may be configured on the cooling unit, that interacts with the guide element of the cooler assembly or engages the latter in such a way that a sliding, largely without play, of the cooling unit up to an intermediate position is assured. The sliding guide arrangement is formed, for example, by a guide bracket formed on the frame structure of the cooling unit. The guide brackets in particular may be one piece components of the frame structure of the cooling unit and manufactured from a stamping and bent component. A manual sliding of the cooling unit is simplified as well as by the attachment of a handgrip.

If the cooling unit is a component of a cooler stack, it is advantageous if of the interior cooling units of the cooler stack can be brought into an extended position, so that its rear side or the front side of the of a cooling unit located immediately behind it are accessible from the outside.

Furthermore, sensing devices may be provided for sensing the actual position of the retaining element and/or the cooling unit. If the sensing devices sense that the retaining element or the cooling unit are located outside their operating position, the operation of the motor vehicle is prevented, for example, by interrupting the ignition circuit. The sensing device may be a switch element, actuated in the operating position of the retaining element and/or the cooling unit, for example, an electro-mechanical switch or a proximity switch.

The vehicle cooling system may be a component of an agricultural utility vehicle, such as a tractor, a harvesting machine or a self propelled spraying machine.

DESCRIPTION OF THE PREFERRED EMBODIMENT

Figure 1:
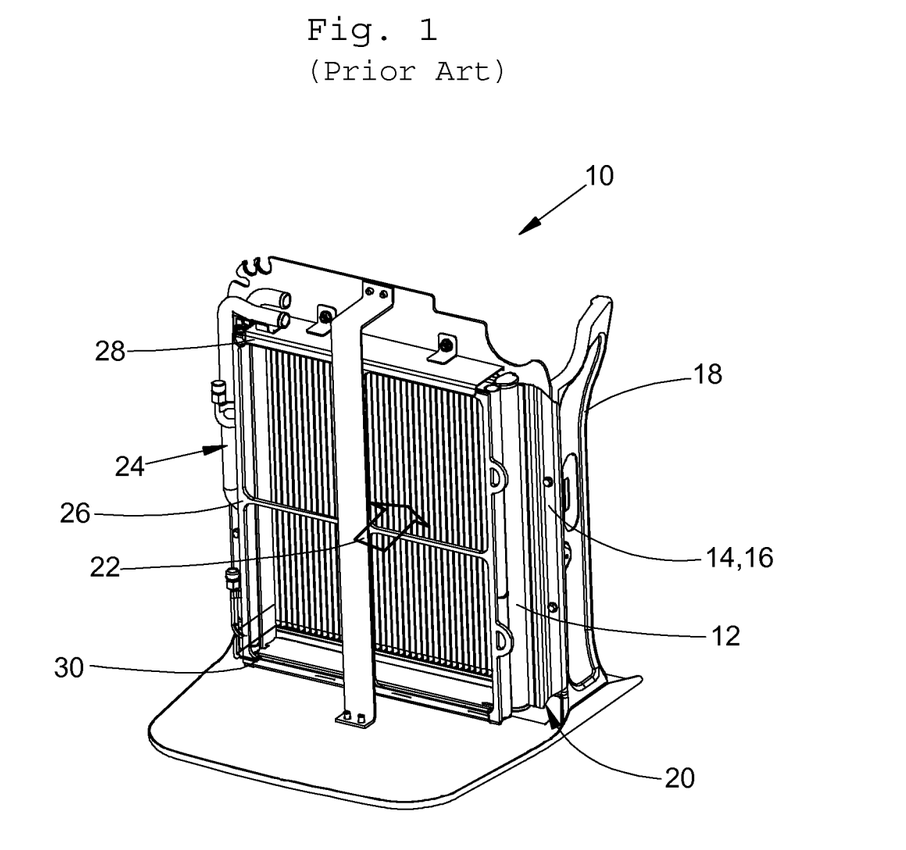
FIG. 1 is a perspective view of a prior art cooler assembly, with several cooling units arranged in a common cooler stack.

Referring to FIG. 1, FIG. 1 shows a perspective view of a cooler assembly, known from the state of the art, as it is applied as a vehicle cooling system, not shown, in the engine compartment of an agricultural motor vehicle, for example, a tractor, a harvesting machine or a self propelled sprayer.

Such a vehicle cooling system, among other items, is known in connection with John Deere Tractors, Model Series 5420, where this is accommodated between an internal combustion engine of the motor vehicle and a vehicle battery in the forward region of the engine compartment for reasons of better accessibility.

The cooler assembly 10, known from the state of the art, shows several cooling units 12, 14 and 16, arranged one behind the other, in the form of a cooler stack 20, rigidly connected to the frame structure 18 of the cooler assembly 10, where the cooler stack 20 is penetrated by a common cooling air flow 22 for the removal of the exhaust heat resulting from the operation of the motor vehicle. The cooling airflow 22 is generated by means of an air suction arrangement, not shown, for example, by the use of an electrically driven blower assembly. Here the air suction arrangement is arranged between the cooler assembly 10 and the internal combustion engine of the motor vehicle.

The cooler stack 20, for example, is provided with a condenser 12 of an air conditioning arrangement of the motor vehicle as seen in the direction of the cooling air flow 22, an air-coolant cooler 14 of a high temperature cooling circuit for the cooling of the combustion engine of the motor vehicle and an air coolant cooler 16 of a low temperature circuit, where the latter is used for the cooling of a gearbox oil cooler of a vehicle gearbox.

In order to prevent the intrusion of large contaminants that are drawn in along with the cooling airflow from the surroundings of the vehicle, a filter element 24 is provided ahead of the cooler stack 20 in the direction of the cooling air flow 22, the filter is configured in the form of a coarse metal sieve carried by a frame 26, that can be manually extracted for the purpose of cleaning along a slot shaped guide 28 or 30 arranged on the cooler assembly 10.

Dust or smoke like contaminant particles are retained only inadequately by the coarse filter element 24, so that there is the possibility that these contaminants can be deposited in the course of time on the surface of the cooling units 12, 14 and 16. The cleaning or maintenance cost is relatively high, since, above all, the individual cooling units 14 and 16 of the cooler stack 20 are not directly accessible from the outside, and therefore cannot be cleaned without disassembling the cooler assembly 10 and with it, the vehicle cooling system. This applies above all when the cooler stack 20 is to include further cooling units, for example, a gearbox oil cooler and/or a charge air cooler, consequently the density of integration of the cooler stack 20 and therefore its propensity relative to contaminants increases.

FIGS. 2a through 2d show perspective views of an embodiment of the cooler assembly, according to the invention.

Figures 2, 4:
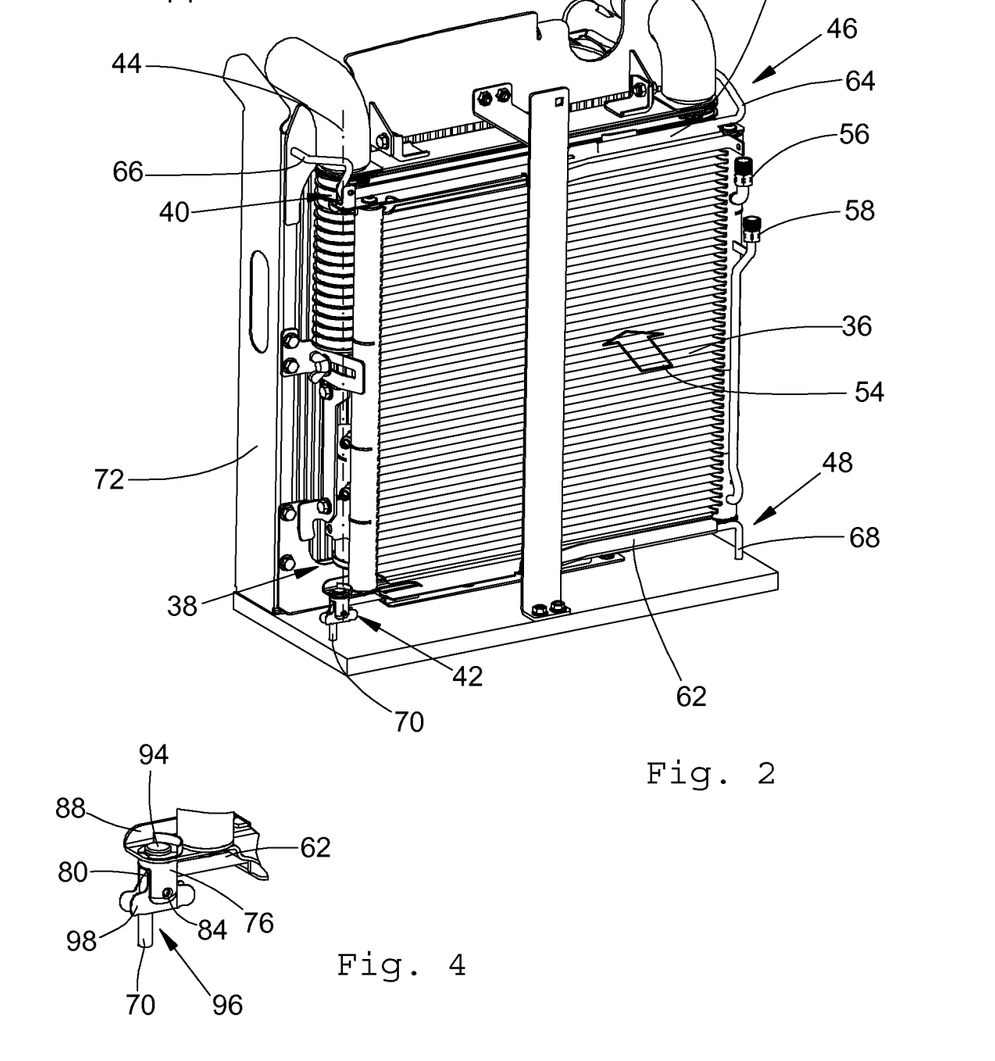
FIG. 2 is a perspective view of a cooler assembly, according to the invention, in which the cooling units are in an operating position.
FIG. 4 is a perspective detailed view of lower left corner portion of the cooler assembly of FIG. 2.
Figure 3:
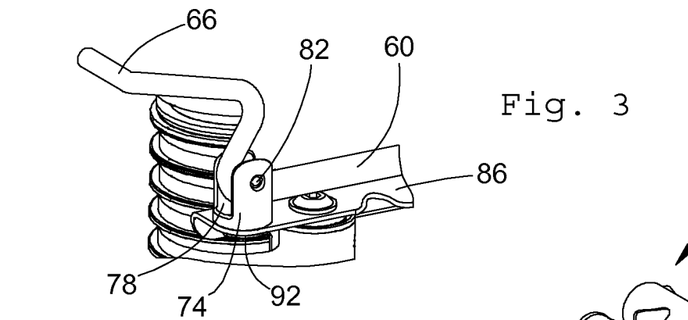
FIG. 3 is a perspective detailed view of an upper left corner portion of the cooler assembly of FIG. 2.
Figure 5:
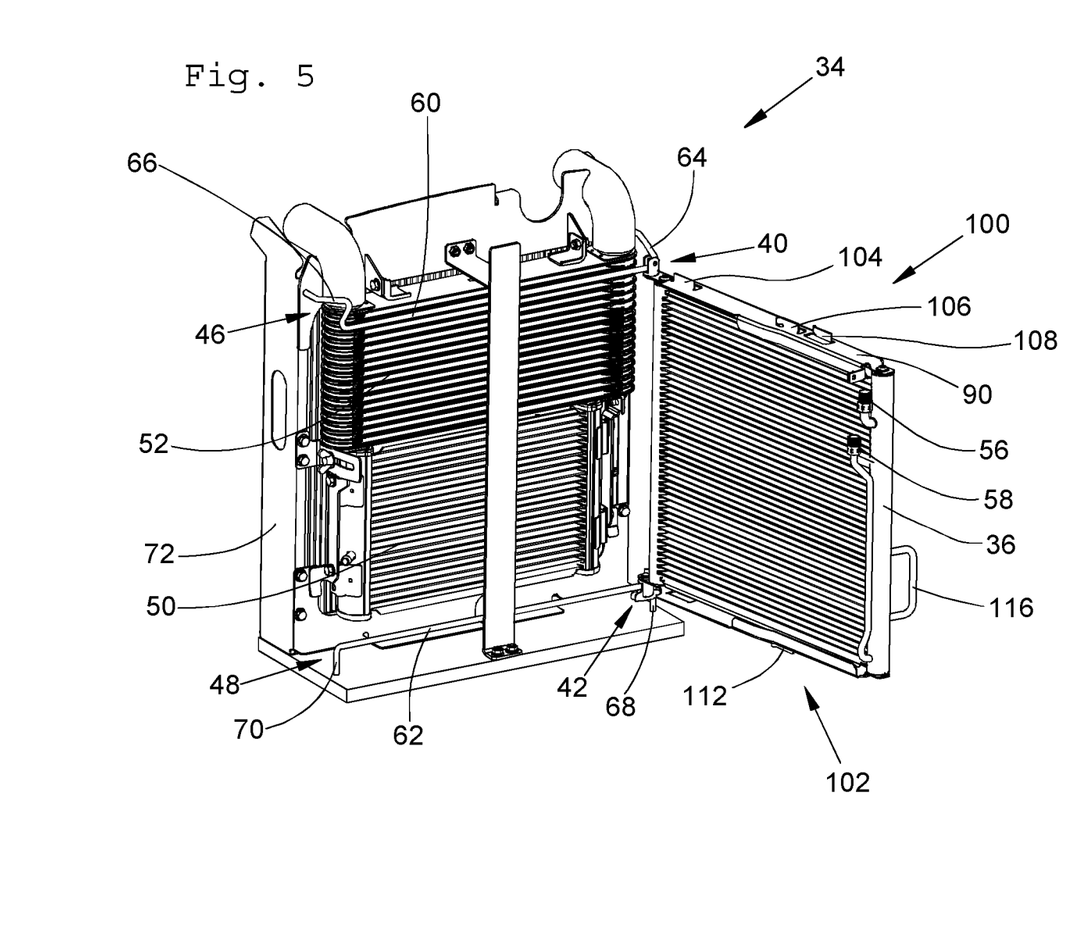
FIG. 5 is a perspective view of a cooler assembly of FIG. 2, showing an interior cooling arrangement of the cooler stack in an intermediate position.
Figure 6:
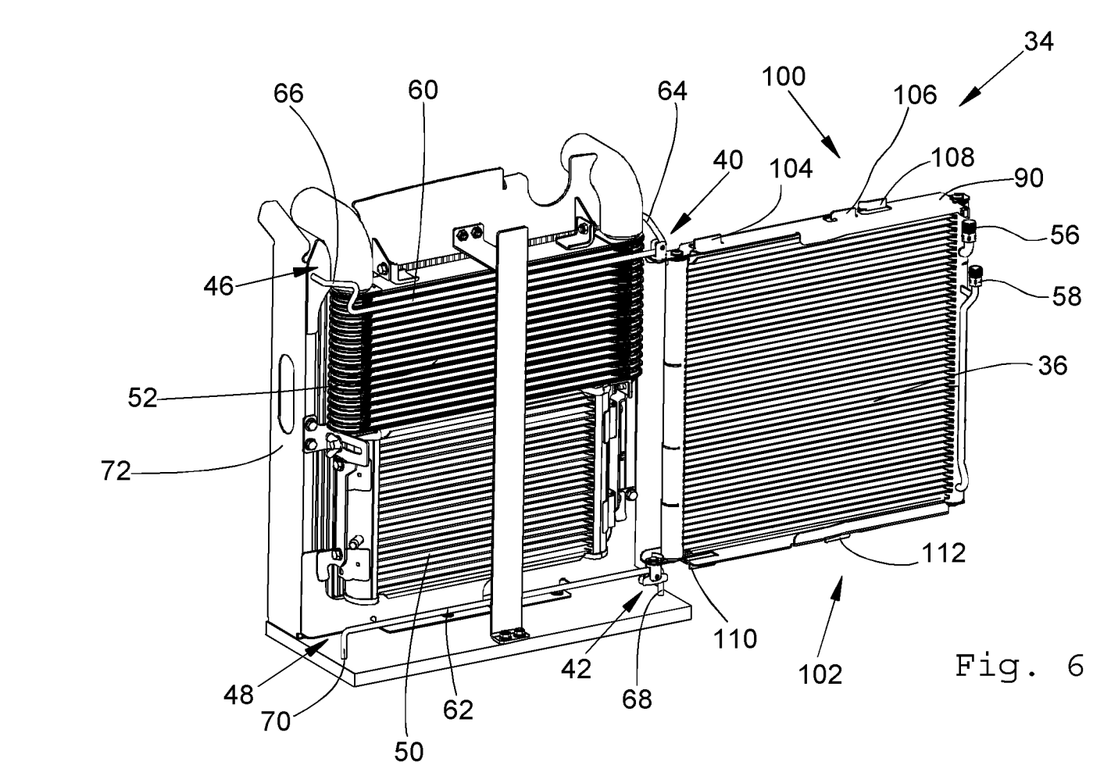
FIG. 6 is a perspective view of a cooler assembly of FIG. 2, showing an interior cooling arrangement of the cooler stack in a cleaning or maintenance position.
Figure 7:
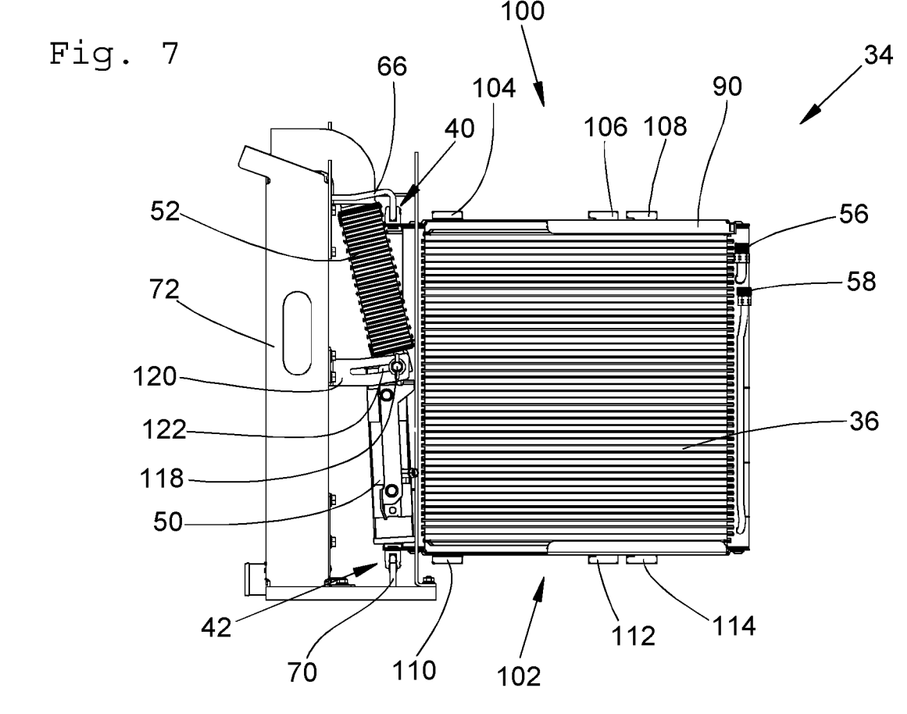
FIG. 7 is a perspective view of a cooler assembly of FIG. 2, showing an interior cooling arrangement of the cooler stack in an extended position.

The cooler assembly 34, according to the invention, differs from the cooler assembly 10 known from the state of the art and shown in FIG. 1 in such a way that of the cooling units 36 of the common cooling stack 38 is fastened, free to pivot, by means of an upper retaining element 40 and a lower retaining element 42 about an axis 44 extending with respect to an end face of the cooling unit 36, where each of the retaining elements 40 or 42 can be slid along a guide element 46 or 48 in such a way that it can be attached to the vehicle cooling system or the cooling arrangement 34, that the cooling unit 36 arranged in the form of a cassette like insertion can be brought out of an operating position, according to FIG. 2a, in which the cooling unit 36 along with further cooling units 50 and 52 of the cooler stack 38 are penetrated by the cooling air flow 54, that can be brought by sliding or extracting into a position outside the cooling airflow 54 and thereby outside the vehicle cooling system or the cooler assembly 34 intermediate position, according to FIG. 2b, and into a maintenance position provided for cleaning or maintenance in the direction of the air suction side of the vehicle cooling system or the cooler assembly 34 according to FIG. 2c.

Correspondingly the cooling unit 36, which may be a condenser of an air conditioning system of the motor vehicle, as well as the cooling units 50 and 52 located behind these, in the present case, a gearbox oil cooler and a charge air cooler, are accessible from the outside without any problem. This applies particularly if the cooler assembly 34 is arranged in the region of the steerable front wheels of the motor vehicle, consequently therefore the cooling unit 36 can be brought by sliding and subsequent pivoting into a freely accessible position.

In order to assure an unimpeded movement of the cooling unit 36 between the operating position and the maintenance position, it is connected to the vehicle cooling system or the cooling arrangement 34 by means of flexible coolant lines, not shown. The coolant lines, consisting of fiber reinforced rubber are arranged on the sides facing away from the retaining element 40 and 42 on the side of the cooling unit 36 and are connected there so that they can be removed by means of corresponding hose connections 56 and 58.

As can be seen in FIG. 2a to 2c, the guide element 46 or 48 includes a bow shaped sliding rod 60 or 62. The sliding rod 60 or 62 has a circular cross section with a diameter in the range of 5 to 15 mm.

The sliding rod, 60 or 62 includes at both its ends attaching legs 64, 66 or 68, 70 extending generally vertically that are welded to a frame structure 72 of the vehicle cooling system or the cooler assembly 34. In the present case the sliding rod 60, 62 and the attachment legs 64, 66 and 68, 70 are one piece components of the guide element 46 or 48, where in this case the guide element 46 or 48 is manufactured in a single operating cycle by chamfering and bending of a full or hollow profile consisting of a steel alloy.

The retaining element 40 or 42 is configured in the present case as a sliding carriage 74 or 76. Starting from the two detailed illustrations in FIG. 2a the sliding carriage 74 or 76 is provided with a slotted opening 78 or 80 that accepts the sliding rod 60 or 62. The slotted opening 78 or 80 surrounds the sliding rod 60 or 62 in the form of a rider at least partially, in such a way that the sliding carriage 74 or 76 can be slid, largely without play, along the sliding rod 60 or 62. The sliding carriage 74 or 76 is a sliding body consisting of a steel alloy that is galvanized and subsequently lacquered for protection against corrosion as is the sliding rod 60 or 62.

To prevent the sliding carriage 74 or 76 from detaching from the sliding rod 60 or 62, the slotted opening 78 or 80 of the sliding carriage 74 or 76 is closed at its outer end by a securing cotter pin 82 or 84.

The cooling unit 36 is fastened by a hinge 86 or 88 to the retaining element 40 or 42 so that it can be pivoted. The hinge 86 or 88 is configured as a component of a frame structure 90 of the cooling unit 36 where this is connected so it cannot be removed by means of a riveted connection 92 or 94 with the retaining element 40 or 42.

In order to further simplify the cleaning and/or maintenance of the cooling unit 36, a locking element 96 is provided for the temporary securing or locking of the lower retaining element 42 in the operating position. The locking element 96 includes a spring element 98 configured as a two sided clamp, to establish a releasable rest or snap position with the particular individual fastening leg 68 or 70 of the lower sliding rod 62, so that an unintentional shifting of the cooling unit 36 can be avoided during the performance of the cleaning or maintenance operation and/or during the operation of the motor vehicle. Here the spring element 98 is fastened by means of the securing cotter pin 84 within the slotted opening 80 of the lower retaining element 42.

In addition a sliding guide 100 or 102 is provided at the cooling unit 36, that interacts with the guide element 46 or 48 in such a way that a sliding is assured, largely without any play, of the cooling unit 36, along the guide element 46 or 48. The sliding guide 100 or 102 is formed by guide brackets 104, 106, 108 or 110, 112, 114, on the frame structure 90 of the cooling unit 36, that are provided with an insertion region that is widened in the insertion direction. A manual sliding of the cooling unit 36 is simplified in this way as well as by the attachment of a handgrip 116.

In order to permit access to the rear side of the interior cooling unit 50 and 52, these can be pivoted into an extended position as shown in FIG. 2d after releasing a security device formed by a T-screw 118 along a guide slot 122 formed in a retainer 120.

Corresponding to a further development of the cooler assembly 34, according to the invention, sensing devices (not shown) are provided for the detection of the actual position of the retaining element 40 or 42 and/or the cooling unit 36. If the sensing devices detect that the retaining element 40 or 42 and/or the cooling unit 36 are out of their operating position, then an operation of the motor vehicle is stopped, for example, by interruption of the ignition circuit of the motor vehicle. The sensing device is a switch element, located and actuated in the operating position of the retaining element 40 or 42 and/or the cooling unit 36 for example an electromechanical switch or a proximity switch.

It should be noted at this point that the above description is intended to describe a preferred configuration only as an example. Rather other embodiments are also conceivable, in which a sliding of the cooling unit 36 is not performed sideways, but upward, and/or several cooling units can be extracted individually from a common cooler stack and can be pivoted into a position appropriate for cleaning or maintenance.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A cooler assembly for a vehicle cooling system, the cooler assembly comprising:
    a frame having an upper part and a lower part, the frame extending laterally from a first side to a second side;
    a first cooling unit mounted to the frame;
    a lower guide member fixedly attached to the lower part of the frame, the lower guide member having a laterally extending lower guide rod;
    an upper guide member fixedly attached to the upper part of the frame, the upper guide member having a laterally extending upper guide rod;
    a lower retainer element slidably mounted on the lower guide rod;

an upper retainer element slidably mounted on the upper guide rod; and a second cooling unit having a lower part pivotally coupled to the lower retainer and having an upper part pivotally coupled to the upper retainer, the second cooling unit thereby being slidable and pivotal with respect to the frame.

2. The cooler assembly of claim 1, wherein:

each retainer element comprises a sliding carriage.

3. The cooler assembly of claim 2, wherein:

each sliding carriage includes a slotted opening that receives a corresponding one of the guide rods.

4. The cooler assembly of claim 2, wherein:

each sliding carriage is formed out of a self lubricating and heat resistant material.

5. The cooler assembly of claim 1, wherein:

each retainer element includes a hinge.

6. The cooler assembly of claim 1, further comprising:

a locking element for securing the retainer element in an operating position and a maintenance position of the second cooling unit.

7. The cooler assembly of claim 6, wherein:

each guide element includes a leg for attaching the guide rod to the frame; and the locking element includes a spring element for releasably engaging the leg.

8. The cooler assembly of claim 1, wherein:

the frame includes a base; and the lower guide member includes a pair of lower legs at opposite ends of the lower guide rod, the lower legs engaging the base.

9. The cooler assembly of claim 8, wherein:

the lower legs extend in a vertical direction.

10. The cooler assembly of claim 8, wherein:

the upper guide member includes a pair of upper legs at opposite ends of the upper guide rod, the upper legs engaging the upper part of the frame.

11. The cooler assembly of claim 10, wherein:

each upper leg includes a generally horizontally extending first part which is fixed to the frame, and a generally vertically extending second part, the second part having a first end fixed to the first part and having a second end which is fixed to the upper guide rod.

* * * * *